United States Patent
Li et al.

(10) Patent No.: US 8,297,946 B2
(45) Date of Patent: Oct. 30, 2012

(54) FAN, MOTOR AND OIL SEALING STRUCTURE THEREOF

(75) Inventors: Yue-Fei Li, Taoyuan Hsien (TW);
Ying-Xi Hu, Taoyuan Hsien (TW);
Dung-Chang Yeh, Taoyuan Hsien (TW);
Yung-Ping Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 844 days.

(21) Appl. No.: 12/230,586

(22) Filed: Sep. 2, 2008

(65) Prior Publication Data
US 2009/0226334 A1    Sep. 10, 2009

(30) Foreign Application Priority Data
Nov. 2, 2007  (TW) ................. 96141531 A

(51) Int. Cl.
*F04B 35/04*    (2006.01)
(52) U.S. Cl. .................... 417/353; 384/119; 310/90
(58) Field of Classification Search .................. 417/353; 384/119; 310/90
See application file for complete search history.

(56) References Cited

U.S. PATENT DOCUMENTS

| | | | | |
|---|---|---|---|---|
| 5,610,462 A * | 3/1997 | Takahashi | | 310/90 |
| 5,834,870 A * | 11/1998 | Tokushima et al. | | 310/90 |
| 7,494,283 B2 * | 2/2009 | Hong et al. | | 384/119 |
| 7,659,649 B2 * | 2/2010 | Lin et al. | | 310/90.5 |
| 7,712,963 B2 * | 5/2010 | Lin et al. | | 384/100 |
| 2005/0220378 A1 * | 10/2005 | Kaneko et al. | | 384/100 |
| 2006/0034714 A1 * | 2/2006 | Ku et al. | | 417/423.1 |
| 2006/0108883 A1 * | 5/2006 | Yeh et al. | | 310/85 |
| 2006/0171826 A1 * | 8/2006 | Wu et al. | | 417/423.13 |
| 2006/0284503 A1 * | 12/2006 | Lin et al. | | 310/90 |
| 2006/0285982 A1 * | 12/2006 | Lin et al. | | 417/354 |
| 2006/0292015 A1 * | 12/2006 | Yazawa et al. | | 417/354 |
| 2007/0058891 A1 * | 3/2007 | Hong et al. | | 384/107 |
| 2007/0075601 A1 * | 4/2007 | Shiraki | | 310/90 |
| 2007/0076992 A1 * | 4/2007 | Hong et al. | | 384/119 |
| 2007/0217720 A1 * | 9/2007 | Lin et al. | | 384/100 |
| 2008/0169733 A1 * | 7/2008 | Lin et al. | | 310/67 R |
| 2009/0079303 A1 * | 3/2009 | Zhang et al. | | 310/67 R |
| 2009/0232678 A1 * | 9/2009 | Yang et al. | | 417/410.1 |

* cited by examiner

*Primary Examiner* — Nimeshkumar Patel
*Assistant Examiner* — Thomas A Hollweg
(74) *Attorney, Agent, or Firm* — Birch, Stewart, Kolasch & Birch, LLP

(57) ABSTRACT

An oil sealing structure of a motor includes a cover and at least one sealing element. The motor has a shaft, a fluid bearing and a bushing. The fluid bearing mounts to the shaft and is accommodated in the bushing. The cover is disposed around the shaft and is connected with an opening of the bushing. The sealing element is disposed around the shaft and between the fluid bearing and the cover. A fan and a motor including the above-mentioned oil sealing structure are also disclosed.

20 Claims, 2 Drawing Sheets

FAN, MOTOR AND OIL SEALING STRUCTURE THEREOF

CROSS REFERENCE TO RELATED APPLICATIONS

This Non-provisional application claims priority under 35 U.S.C. §119(a) on Patent Application No(s). 0961141531, filed in Taiwan, Republic of China on Nov. 2, 2007, the entire contents of which are hereby incorporated by reference.

BACKGROUND OF THE INVENTION

1. Field of Invention

The present invention relates to an oil sealing structure and in particular to an oil sealing structure applied to a fan and a motor.

2. Related Art

The motor is the heart of a fan. In order to keep a motor in smooth and steady as rotating in high speed, a sleeve bearing is employed to support the shaft of the motor in the prior art. The shaft passes through the sleeve bearing. In addition, an oil seal structure is disposed above the sleeve bearing and around the shaft, so that the lubricant can be contained in the sleeve bearing.

However, the oil seal structure is disposed around the shaft, so that the space for containing the lubricant cannot be airtightly sealed. Therefore, when the motor runs under high speed for a long time, the lubricant will easily leak from the gap between the sleeve bearing and the shaft. If the motor is turned over and still rotates, the lubricant will leak much faster because of the gravity. This will decrease the lubrication between the shaft and the sleeve bearing, Thereby reduce the reliability and lifetime of the motor and the efficiency of the fan.

SUMMARY OF THE INVENTION

In view of the foregoing, the present invention is to provide a fan, a motor and an oil sealing structure that have a sealing element for sealing the lubricant in the fluid bearing to decrease the consumption of the lubricant. In addition, the lubricant absorbed by the sealing element can be released in the fluid bearing to keep the lubrication of the shaft of the motor so as to increase the reliability and the lifetime of the fan and the motor thereof.

To achieve the above, the present invention discloses an oil sealing structure of a motor. The motor has a shaft, a fluid bearing and a bushing. The fluid bearing mounts to the shaft and is accommodated in the bushing. The oil sealing structure includes a cover and at least one sealing element. The cover is disposed around the shaft and connects to one end of the bushing. The sealing element is disposed around the shaft and between the fluid bearing and the cover.

To achieve the above, the present invention also discloses a motor which includes a bushing, a shaft, a fluid bearing and an oil sealing structure. The shaft passes through the bushing, and the fluid bearing is mounted to the shaft and is accommodated in the bushing. The oil sealing structure includes a cover and at least one sealing element. The cover is disposed around the shaft and is connected to one end of the bushing. The sealing element is disposed around the shaft and between the fluid bearing and the cover.

In addition, the present invention further discloses a fan including a motor and an impeller. The motor includes a bushing, a shaft, a fluid bearing and an oil sealing structure. The shaft passes through the bushing, and the fluid bearing is mounted to the shaft and is accommodated in the bushing. The oil sealing structure includes a cover and at least one sealing element. The cover is disposed around the shaft and is connected to one end of the bushing. The sealing element is disposed around the shaft and between the fluid bearing and the cover. The impeller is connected to the shaft, so that the motor can drive the impeller to rotate.

As mentioned above, the fan, motor and oil sealing structure of the present invention utilize a sealing element and a buffer element to form the oil sealing structure of the fluid bearing. The sealing element is disposed between the cover and the fluid bearing of the motor, and the buffer element is disposed between the impeller of the fan and cover. Compared with conventional oil seal structures, the sealing element of the present invention is, for example, made of sponge-like material, so that it can absorb or release lubricant to keep the lubrication state of the shaft. In addition, the buffer element is, for example, made of rubber material to seal the opening of the bushing, so that the leakage of lubricant can be prevented. This can form a secondary protection to keep the lubricant within the fluid bearing efficiently, thereby decreasing the consumption of the lubricant and increasing the reliability and lifetime of the fan and the motor thereof.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
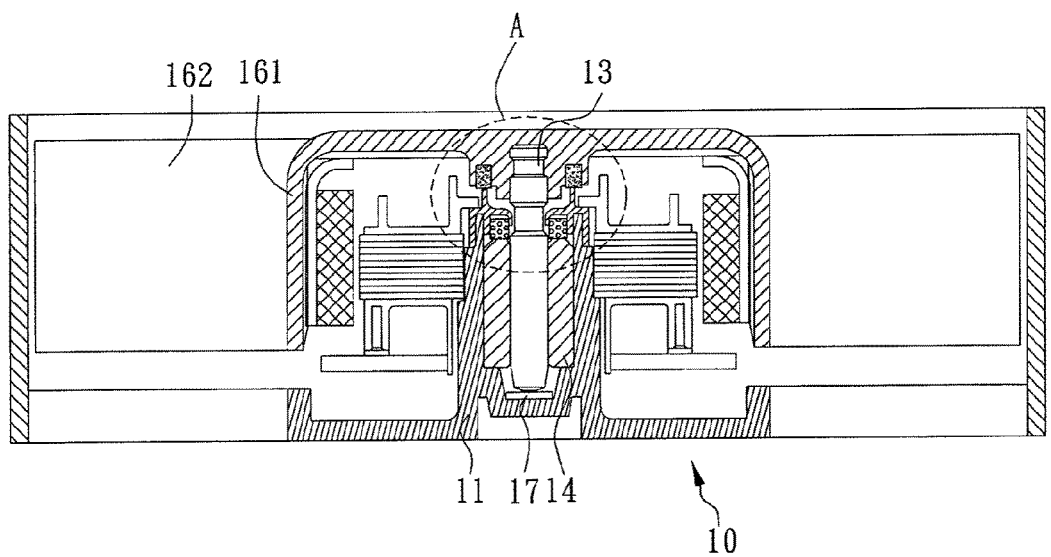
FIG. 1 is a schematic diagram of a fan and a motor thereof according to the preferred embodiment of the present invention.
Figure 2:
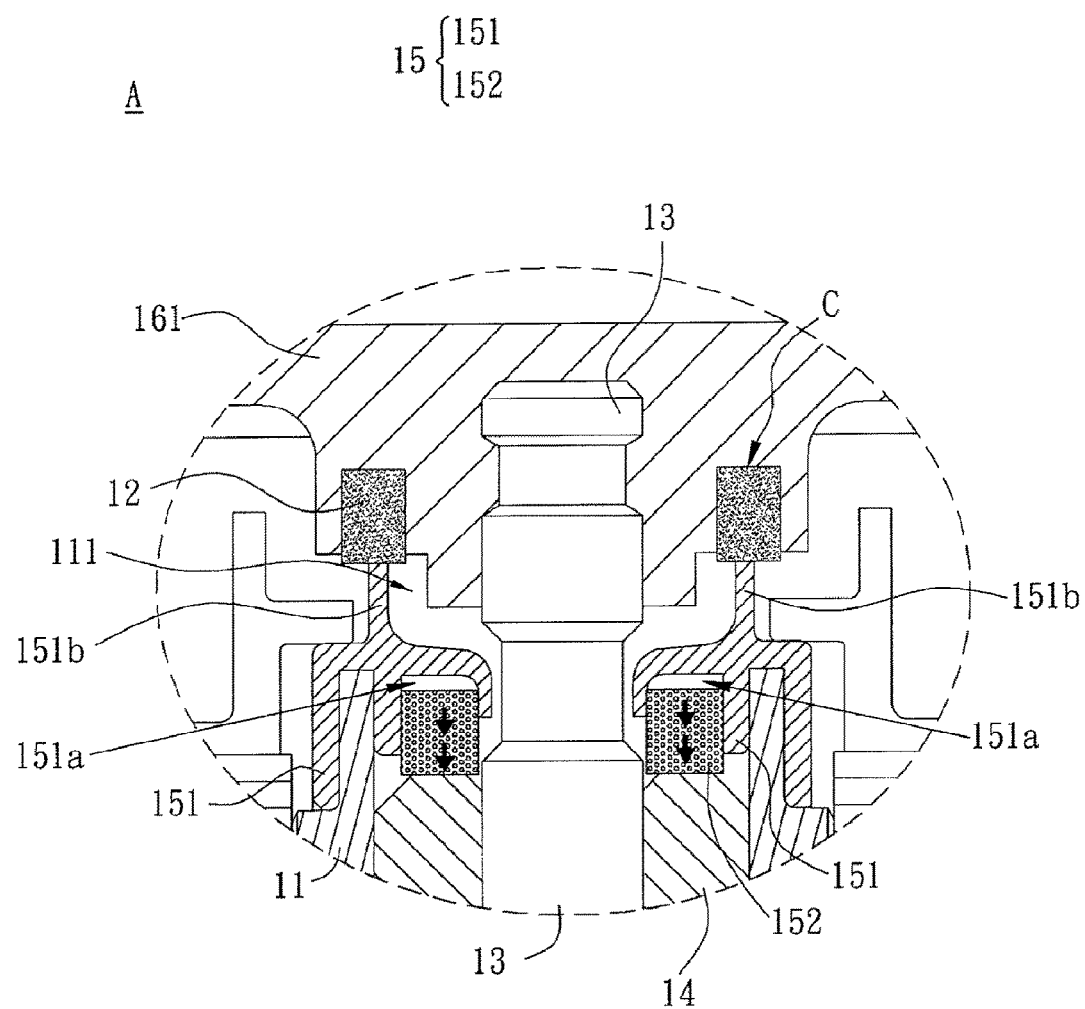
FIG. 2 is an enlarged diagram of an oil sealing structure as the portion A of FIG. 1.

FIG. 1 is a schematic diagram of a fan and a motor thereof according to the preferred embodiment of the present invention. FIG. 2 is an enlarged diagram of an oil sealing structure as the portion A of FIG. 1. Referring to FIG. 1 and FIG. 2, a fan 1 according to the embodiment of the present invention includes an impeller 16 and a motor 10, which drives the impeller 16. The motor 10 includes a bushing 11, a shaft 13, a fluid bearing 14 and an oil sealing structure 15. The fan 1 can be an axial-flow fan or a centrifugal fan, and the motor 10 can be an inner-rotor type motor or an outer-rotor type motor. In this embodiment, the motor 10 is, for example but not limited to, an outer-rotor type motor of an axial-flow fan.

The motor 10 has a shaft 13 passing through the bushing 11. A washer 17 is disposed at the bottom of the bushing 11, and the washer 17 urges against the shaft 13 for positioning the shaft 13. The shaft 13 passes through the fluid bearing 14, and the fluid bearing 14 is accommodated in the bushing 11. In the embodiment, the fluid bearing 14 can be a sleeve bearing to supply lubrication for the rotating shaft 13.

Referring to FIG. 2, the oil sealing structure 15 has a cover 151 and at least one sealing element 152. The cover 151 has a ring-shaped trench 151a and a ring-shaped flange 151b. Herein, the ring-shaped trench 151a and ring-shaped flange 151b are disposed at opposite sides of the cover 151. The cover 151 can be, for example but not limited to, a lid or a partition. In the embodiment, the cover 151 is disposed around the shaft 13 and covers an opening 111 of the bushing 11. The sealing element 152 is disposed in a space formed by the ring-shaped trench 151a and the sealing element 152 is made of a material capable of absorbing fluids, such as a sponge. In this embodiment, the sealing element 152 is disposed around the shaft 13 and located between the fluid bearing 14 and the cover 151. Preferably, the sealing element 152 urges against one end of the fluid bearing 14.

When the fan 1 and the motor 10 are turned over, the fluid bearing 14 can still provide the lubrication for the rotating shaft 13. Although the lubricant of the fluid bearing 14 flows toward the sealing element 152 due to the gravity, the lubricant is not leaked from the fluid bearing 14 due to that the sealing element 152 urges against the end of the fluid bearing 14 and the wall of the cover 151, and that the atmospheric pressure is higher than the inner pressure of the fluid bearing 14. In addition, since the sealing element 152 is made of a sponge-like material, it can absorb the lubricant and the absorbed lubricant can be provided back again to the fluid bearing 14, as the arrow shown in FIG. 2.

Referring both to FIG. 1 and FIG. 2 again, the impeller 16 has a hub 161 and a plurality of blades 162 connected around the hub 161. It should be noted that the fan 1 can further include a buffer element 12 disposed between the hub 161 and cover 151. For example, the buffer element 12 is a rubber, and is preferably a ring-shaped rubber disposed at a groove "C" of the inner side of the hub 161. The ring-shaped flange 151b of the cover 151 urges against the buffer element 12, so that the cover 151 can be fixed.

When the fan 1 and the motor 10 are turned over, the buffer element 12, which is disposed at the groove "C" of the inner side of the hub 161, can buffer the fan 1. In addition, the buffer element 12 is disposed corresponding to the ring-shaped flange 151b of the cover 151 so as to form the secondary isolation of the lubricant, so that the oil sealing structure 15 can prevent the lubricant from leaking from the fluid bearing 14.

In summary, the fan, motor and oil sealing structure of the present invention utilize a sealing element and a buffer element to form the oil sealing structure of the fluid bearing. The sealing element is disposed between the cover and the fluid bearing of the motor, and the buffer element is disposed between the impeller of the fan and cover. Compared with the related art, the sealing element of the present invention is, for example, made of sponge-like material, so that it can absorb or release lubricant to keep the lubrication state of the shaft. In addition, the buffer element is, for example, made of rubber material to seal the opening of the bushing, so that the leakage of lubricant can be prevented. This can form a secondary protection to keep the lubricant within the fluid bearing efficiently, thereby decreasing the consumption of the lubricant and increasing the reliability and lifetime of the fan and the motor thereof.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. An oil sealing structure applied to a motor, the motor having a shaft, a fluid bearing and a bushing, and the fluid bearing mounting the shaft and being accommodated in the bushing, the oil sealing structure comprising:

a cover disposed around the shaft and connected to one end of the bushing, wherein the cover has a trench; and at least one sealing element disposed around the shaft and between the fluid bearing and the cover, wherein the sealing element is partially accommodated in a space formed by the trench, the sealing element has a first side and a second side opposite to the first side, and the first side is in contact with the bearing and the second side is toward to and apart from the trench.

2. The oil sealing structure of claim 1, wherein the cover is a lid or a partition, and the trench is a ring-shaped trench.

3. The oil sealing structure of claim 1, wherein the end of the bushing has an opening, and the cover covers the opening of the bushing.

4. The oil sealing structure of claim 1, wherein the sealing element comprises a material capable of absorbing fluids, such as a sponge.

5. A motor, comprising:

a bushing;

a shaft passing through the bushing;

a fluid bearing mounted to the shaft and accommodated in the bushing; and an oil sealing structure comprising a cover and at least one sealing element, wherein the cover is disposed around the shaft and connected to one end of the bushing, the sealing element is disposed around the shaft and between the fluid bearing and the cover, the cover has a trench, and the sealing element is partially accommodated in a space formed by the trench, the sealing element has a first side and a second side opposite to the first side, and the first side is in contact with the bearing and the second side is toward to and apart from the trench.

6. The motor of claim 5, wherein the cover is a lid or a partition, and the trench is a ring-shaped trench in which the sealing element is accommodated.

7. The motor of claim 5, wherein the end of the bushing has an opening, and the cover covers the opening of the bushing.

8. The motor of claim 5, wherein the sealing element comprises a material capable of absorbing fluids, such as a sponge.

9. The motor of claim 5, wherein the motor is an inner-rotor type motor or an outer-rotor type motor.

10. A fan, comprising:

a motor, comprising:

a bushing, a shaft passing through the bushing, a fluid bearing mounted to the shaft and accommodated in the bushing, and an oil sealing structure comprising a cover and at least one sealing element, wherein the cover is disposed around the shaft and connected to one end of the bushing, and the sealing element is disposed around the shaft and between the fluid bearing and the cover, the cover has a trench, and the sealing element is partially accommodated in a space formed by the trench, the sealing element has a first side and a second side opposite to the first side, and the first side is in contact with the bearing and the second side is toward to and apart from the trench; and an impeller comprising s a hub and a plurality of blades disposed around the hub, the impeller being connected with the shaft so that the motor drives the impeller to rotate.

11. The fan of claim 10, wherein the cover is a lid or a partition, and the trench is a ring-shaped trench in which the sealing element is accommodated.

12. The fan of claim 10, wherein the cover further has a ring-shaped flange disposed opposite to the trench.

13. The fan of claim 12, further comprising a buffer element disposed between the hub and the cover, wherein the buffer element is placed opposite to the ring-shaped flange.

14. The fan of claim 13, wherein the ring-shaped flange of the cover pushes the buffer element to urge against the hub.

15. The fan of claim 14, wherein the buffer element comprises a rubber.

16. The fan of claim 10, wherein the sealing element comprises a material capable of absorbing fluids, such as a sponge.

17. The fan of claim 10, wherein the end of the bushing has an opening, and the cover covers the opening of the bushing.

18. The fan of claim 10, wherein the fluid bearing is a sleeve bearing.

19. The fan of claim 10, wherein the motor is an inner-rotor type motor or an outer-rotor type motor.

20. The fan of claim 10, wherein the fan is an axial-flow fan or a centrifugal fan.

* * * * *